UNITED STATES PATENT OFFICE.

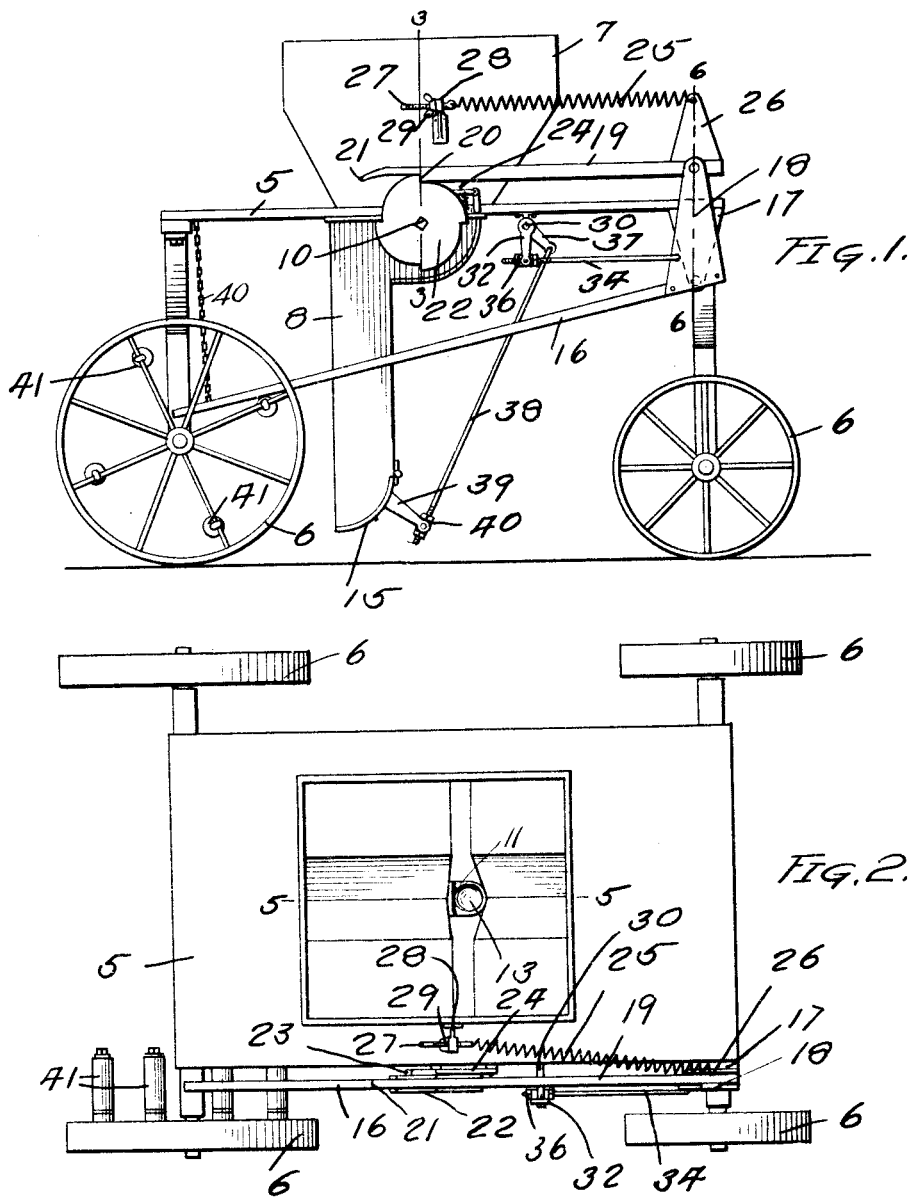

ARTHUR KILLEY, OF BRECKSVILLE, OHIO.

POTATO-PLANTER.

1,198,928.          Specification of Letters Patent.     Patented Sept. 19, 1916.

Application filed August 4, 1915. Serial No. 43,629.

*To all whom it may concern:*

Be it known that I, ARTHUR KILLEY, a citizen of the United States, residing at Brecksville, in the county of Cuyahoga, State of Ohio, have invented certain new and useful Improvements in Potato-Planters; and I do hereby declare the following to be a full, clear, and exact description of the invention, such as will enable others skilled in the art to which it appertains to make and use the same.

This invention relates to improvements in potato planters and is directed more particularly to that type of implements embodying an intermittently operable feed mechanism for distributing the potatoes at spaced distances apart in a row.

In carrying out the invention it is primarily my object to construct a planter in which the feed mechanism comprises a distributing wheel for delivering the potatoes into a discharge chute, and a controlling valve for the chute, automatically operable means being embodied for opening the valve upon movement in one direction and for closing the valve and simultaneously actuating the distributing wheel upon movement in the opposite direction.

It is further an object to provide a feeding mechanism embodying the above advantages that is at the same time of an exceedingly simple structure while sacrificing none of the features of efficiency and durability necessary in devices of this character.

With the above and other objects and advantages in view, the invention resides more particularly in the novel combination, formation and arrangement of parts as more fully described hereinafter and pointed out in the appended claim.

Reference is had to the accompanying drawings, wherein similar characters of reference designate corresponding parts throughout the several views, and in which:

Figure 1 is a side elevation of a potato planter constructed in accordance with the present invention and Fig. 2 is a top plan view thereof.

Referring now more particularly to the accompanying drawings there is shown a potato planter including a body frame 5 which is supported by the ground wheels 6 and which carries a hopper bin 7 from the front portion of which depends a chute 8. Transversely journaled in bearings on the bottom of the frame rearwardly of the chute is a shaft 10 and fixed on this shaft is a feed or distributing wheel 11 which extends through a slot in the bottom of the hopper bin and which has formed at spaced intervals on its periphery cups 13, this wheel projecting into the chute 8 so that upon the rotation thereof it is adapted to discharge potatoes from its cups into the chute. Pivoted to the lower end of the chute, which is beveled in the usual manner, is a valve plate 15 which normally closes the discharge mouth of the chute to regulate the dropping of potatoes therefrom.

The improved means for actuating the wheel 11 and the valve 15 to drop potatoes at regularly spaced intervals includes a tripping lever 16 which is pivoted at its rear end to a depending bracket 17 carried at one side of the frame and which extends forwardly adjacent the ground wheel 6 of that side. Carried at the rear end of this lever is an upstanding arm 18 and this arm is pivoted at its otherwise free end to the rear end of a pawl lever 19 which extends therefrom forwardly and is provided adjacent its free end with a shoulder 20 and has its bottom forwardly of the shoulder curved downwardly therefrom as at 21 and upon reciprocating movement of the pawl lever is adapted to engage the teeth of a ratchet wheel 22 carried on the adjacent end of the shaft 10 and rotates the shaft in successive steps to rotate the wheel 11. This ratchet wheel carries a number of teeth equal to the number of cups 13 on the wheel 11, in the drawing there being but four teeth shown and consequently that number of cups. The shaft is held against undesired retrograde movement by a second and smaller ratchet wheel 23 which is fixed on the shaft 10 adjacent the wheel 22 and is engaged by a spring urged pawl 24 carried on the frame. The pawl lever 19 is resiliently urged into engagement with the wheel 22 by a spring 25 which is secured at one end to an upstanding arm 26 carried by the rear end of the lever, and secured at its other end to an adjusting screw 27 which is passed through a bracket 28 carried on the side of the hopper bin, a wing nut 29 being threaded on this screw to properly adjust the tension of the spring. Thus by vertically rocking the lever 16 the feed wheel will be rotated in successive steps to intermittently discharge potatoes into the chute. The means whereby such movement of the lever also serves to intermittently open and close the valve plate 15 to discharge the potatoes in the ground at regularly spaced intervals, comprises a shaft 30 which is transversely journaled beneath the frame 5, and has depending rearwardly from its outer end an arm 32 apertured to loosely receive one end of a link 34 which has its other end laterally directed and pivotally engaged through the intermediate portion of the main lever arm 18. This link is adjusted with relation to the arm 32 by the nuts 36 threaded thereon at each side of the arm. The inner end of the shaft carries a rearwardly depending arm 37 and a link 38 is pivotally secured thereto at one end and has its other end passed through an arm 39 extending forwardly from the valve plate 15, this link being adjustable with relation to the arm as by nuts 40 whereby together with the nuts 35 of the other link adjustment may be made to properly regulate the movement of the valve plate with respect to the degree of swinging movement of the arm 18.

The means carried by the wheel 6 and engaging the tripping lever 16 comprises rollers 41 suitably supported for rotation from certain of the spokes of said wheel. Thus, in the operation of the machine, as the wheel 6 rotates upon its travel over the ground the rollers 41 successively engage the lever 16 and swings it upwardly to thus retract the pawl lever 19. As the roller passes the end of the lever and thus releases it, the spring 25 draws the pawl lever 19 forwardly to rotate the shaft 10 in one step and thus drop a potato into the chute. The lever 16 during this movement swings downwardly into position to be engaged by the next roller 41, a chain 48 being so connected to the free end of the lever and to the frame as to limit this downward swinging movement. Upon the next roller engaging the lever and lifting it, the arm 18 thereof will rock the shaft 30 to lift the link 38 and thus swing the valve 15 open to release the potatoes. As soon however as movement downwardly of the lever 16 is started the valve 15 closes to catch the potato which is dropped by the feed wheel. A relatively simple feeding mechanism is thus provided wherein the parts may be readily adjusted to properly regulate their relative movements.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claim.

What is claimed is:

A planter comprising in combination, a hopper, a discharge chute, a valve for said chute, a rotary distributer between the chute and hopper, a ratchet wheel fixed to the distributer, a pivoted trip lever, a ratchet lever pivoted at one end to the trip lever with its other end operatively engaging the ratchet wheel, connections between the trip lever and valve, means for moving the trip lever in one direction to open the valve and retract the ratchet lever, and a spring connected with the ratchet lever and yieldably maintaining the same in operative engagement with the ratchet wheel, said spring being operable to return said trip and ratchet levers to simultaneously close the valve and actuate the distributer.

In testimony whereof, I affix my signature, in the presence of two witnesses.

ARTHUR KILLEY.

Witnesses:
S. P. INMAN,
DESTINE INMAN.

Copies of this patent may be obtained for five cents each, by addressing the "Commissioner of Patents, Washington, D. C."